(12) United States Patent
Yang (10) Patent No.: US 9,465,136 B2
(45) Date of Patent: Oct. 11, 2016

(54) RADIATION DETECTOR, PROCESSOR MODULE, AND METHODS OF DETECTING RADIATION AND WELL LOGGING

(71) Applicant: Saint-Gobain Ceramics & Plastics, Inc., Worcester, MA (US)

(72) Inventor: Kan Yang, Solon, OH (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

(21) Appl. No.: 14/631,322

(22) Filed: Feb. 25, 2015

(65) Prior Publication Data

US 2015/0241594 A1    Aug. 27, 2015

Related U.S. Application Data

(60) Provisional application No. 61/945,438, filed on Feb. 27, 2014.

(51) Int. Cl.
  *G01V 5/04*  (2006.01)

(52) U.S. Cl.
  CPC .................................. G01V 5/045 (2013.01)

(58) Field of Classification Search
  CPC ...................................................... G01V 5/102
  See application file for complete search history.

(56) References Cited

U.S. PATENT DOCUMENTS

| | | | |
|---|---|---|---|
| 3,869,608 A * | 3/1975 | Scherbatskoy | 376/160 |
| 3,882,309 A | 5/1975 | Paap | |
| 5,412,217 A | 5/1995 | Miyashita et al. | |
| 7,655,919 B1 | 2/2010 | Shah et al. | |
| 7,847,262 B1 | 12/2010 | Shah et al. | |
| 8,173,954 B2 | 5/2012 | Duraj | |
| 8,362,439 B1 | 1/2013 | Shah et al. | |
| 8,440,980 B2 | 5/2013 | Shah et al. | |
| 8,586,935 B2 | 11/2013 | Shah et al. | |
| 8,598,533 B2 | 12/2013 | Menge et al. | |
| 2002/0175291 A1 | 11/2002 | Reeder et al. | |
| 2003/0033097 A1 | 2/2003 | Tanaka et al. | |
| 2010/0176286 A1 | 7/2010 | Duraj | |
| 2012/0126127 A1 * | 5/2012 | Duraj et al. | 250/369 |
| 2012/0326043 A1 | 12/2012 | Duraj | |
| 2013/0181137 A1 | 7/2013 | Watanabe et al. | |
| 2013/0341511 A1 | 12/2013 | Shah et al. | |
| 2014/0319330 A1 * | 10/2014 | Berheide et al. | 250/269.5 |

FOREIGN PATENT DOCUMENTS

| | | |
|---|---|---|
| WO | 2013003349 A1 | 1/2013 |
| WO | 2013059394 A1 | 4/2013 |

OTHER PUBLICATIONS

International Search Report and Written Opinion for PCT Application No. PCT/US2015/017510, dated May 27, 2015, 14 pages.
Guss, Paul et al., "Dual Gamma/Neutron Directional Elpasolite Detector," Abstract, SPIE Proceedings, vol. 8854, Sep. 26, 2013, 2 pages.

(Continued)

*Primary Examiner* — Yara B Green
*Assistant Examiner* — Hugh H Maupin
(74) *Attorney, Agent, or Firm* — Abel Law Group, LLP; Robert N Young (57) ABSTRACT

A control module for a radiation detector can be configured to use a first pulse shape discrimination technique at a first state, and use a second pulse shape discrimination technique at a second state.

18 Claims, 7 Drawing Sheets

(56) References Cited

OTHER PUBLICATIONS

Menge, P.R. et al., "Behavior of Cs2LiYCl6:Ce Scintillator up to 175° C," Abstract, Nuclear Science Symposium and Medical Imaging Conference, dated 2011, 2 pages.
Chandra, Anirudg, "Neutron Detection by Pulse Shape Discrimination," Saha Institute of Nuclear Physics, National Institute of Technology, Trichy, Nov. 7, 2013, 47 pages.
Shirwadkar, U. et al., "Novel Scintillation Material Cs2LiLaBr6-xClx:Ce for Gamma-ray and Neutron Spectroscopy," IEEE Nuclear Science Symposium and Medical Imaging Conference Record (NSS/MIC), dated 2012, pp. 1963-1967.
Watanabe, K. et al., "Temperature Dependence of Neutron-Gamma Discrimination Based on Pulse Shape Discrimination Technique in a Ce:LiCaAlF6 Scintillator," Abstract, Nuclear Science, IEEE Transationc, vol. 60, Issue 2, Apr. 2013, 2 pages.

* cited by examiner

RADIATION DETECTOR, PROCESSOR MODULE, AND METHODS OF DETECTING RADIATION AND WELL LOGGING

CROSS-REFERENCE TO RELATED APPLICATIONS

The present application claims priority to U.S. Provisional Patent Application No. 61/945,438, filed Feb. 27, 2014, entitled "Radiation Detector, Processor Module, and Methods of Detecting Radiation and Well Logging", naming as an inventor Kan Yang, which application is incorporated by reference herein in its entirety.

FIELD OF THE DISCLOSURE

The present disclosure is directed to radiation detectors, processor modules, and methods of detecting radiation and well logging.

BACKGROUND

A radiation detector can include a scintillator, a photosensor optically coupled to the scintillator, and a processor module that can receive an electronic pulse from the photosensor. At room temperature, the radiation detector may operate without a problem. The ability to accurately detect radiation under harsh environmental conditions can be problematic. The scintillator can include a sensitive material that needs to operate over a broad temperature range, such as from room temperature to elevated temperatures that may be in excess of 150° C. The industry continues to need improved radiation detectors capable of reliable service and stable analysis over a wide range of temperatures.

BRIEF DESCRIPTION OF THE DRAWINGS

Embodiments are illustrated by way of example and are not limited by the accompanying figures.

Skilled artisans appreciate that elements in the figures are illustrated for simplicity and clarity and have not necessarily been drawn to scale. For example, the dimensions of some of the elements in the figures may be exaggerated relative to other elements to help improve understanding of embodiments of the invention. The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

The term "fast" is intended to mean that scintillating light corresponding to an electronic pulse has a short rise time, a short decay time, or a short total luminescent time above a threshold intensity level. Compare with "slow" below.

The term "figure of merit" is intended to mean a difference between the centroids of two different peaks divided by the sum of the full width at half maximum ("FWHM") for each peak. Figure of merit is useful to determine how well different peaks can be resolved. A higher figure of merit corresponds to peaks being more easily resolved, and a lower figure of merit corresponds to peaks being more difficult to resolve.

The term "predominant luminescent mechanism" is intended to mean one of at least two luminescent mechanisms that provides more intense scintillating light as compared to any other luminescent mechanism at a particular environmental state, such as a particular temperature.

The term "radiation type" is intended to mean radiation of a different character, such as gamma radiation, neutrons, x-rays, alpha particles, beta particles, deuterium, tritium, or the like. Radiation type is not intended to mean a different radiation intensity, a different radiation flux or radiation source for the same radiation type. For example, cobalt 60 ("$^{60}$Co") and cesium 137 ("$^{137}$Cs") can emit gamma radiation at different intensities or different radiation fluxes; however, the radiation type is gamma radiation, not $^{60}$Co and $^{137}$Cs or their corresponding radiation intensities or fluxes.

The term "rare earth" or "rare earth element" is intended to mean Y, Sc, and the Lanthanoids (La to Lu) in the Periodic Table of the Elements.

The term "slow" is intended to mean that the scintillating light corresponding to the electronic pulse has a long rise time, a long decay time, or a long total luminescent time above a threshold intensity level. Compare with "fast" above.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillation and radiation detection arts.

A processor module for a radiation detector can be configured to use a pulse shape discrimination ("PSD") technique when the radiation detector is at a particular state and use a different PSD technique when the radiation detector is at a different state. In an embodiment, a radiation detector can include a scintillator that has a predominant luminescent mechanism at a particular temperature and a different predominant luminescent mechanism as at different temperature. In a particular embodiment, the scintillator can include a material that exhibits significant core valence luminescence ("CVL") when the scintillator captures radiation at a temperature no greater than 150° C., and exhibits significant non-CVL when the scintillator captures radiation at a temperature greater than 100° C. When the scintillator is part of a dual-mode detector, a PSD technique better suited for lower temperatures is used at such lower temperatures, and a different PSD technique better suited for higher temperatures is used at such higher temperatures. In a particular embodiment, a scintillator including a Li-containing rare earth compound can be used to detect gamma radiation and neutrons. When the scintillator is at a temperature less than a switchover temperature, a particular PSD technique can be used to discriminate between neutrons and gamma radiation that causes CVL, and when the scintillator is at a temperature higher than the switchover temperature, a different PSD technique can be used to discriminate between neutrons and gamma radiation that causes non-CVL. Thus, a radiation detector can be used to discriminate between neutrons and gamma radiation at a temperature of 150° C. and higher.

The apparatuses and methods as described in more detail below are used to illustrate and improve the understanding of the concepts as described herein. The description is not intended to limit the scope of the appended claims. For example, while some embodiments are described with respect to a drilling apparatus or well logging, after reading this specification, skilled artisans will understand that other apparatuses and methods can be used, particularly those where the scintillator is exposed to relatively high temperatures.

Figure 1:
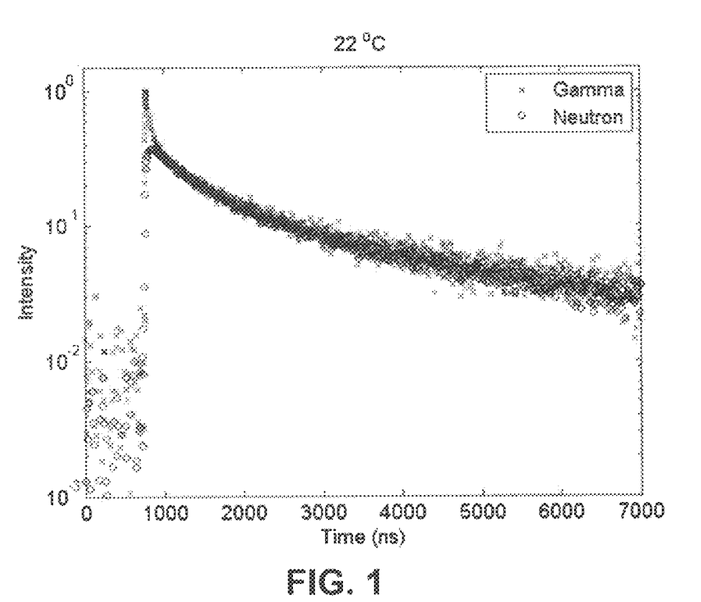
FIG. 1 includes a plot of electronic pulses corresponding to neutron and gamma radiation when such radiation is captured as 22° C.
Figure 2:
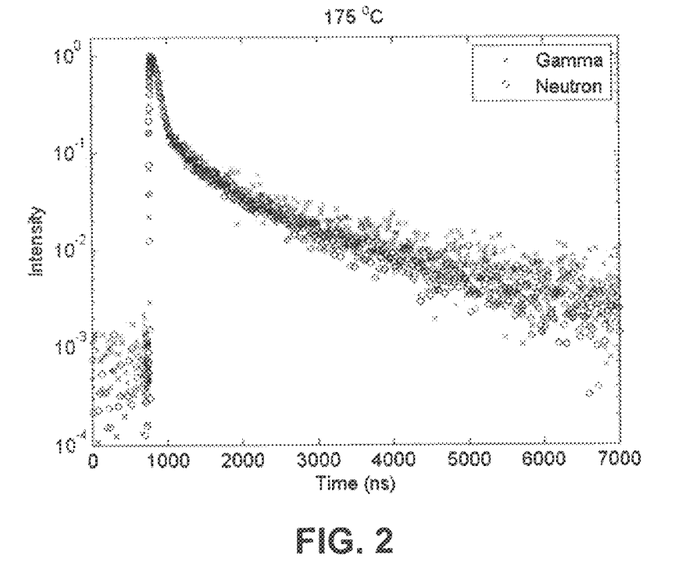
FIG. 2 includes a plot of electronic pulses corresponding to neutron and gamma radiation when such radiation is captured as 175° C.

FIGS. 1 and 2 include electronic pulses as output from a photosensor when a scintillator emits scintillating light in response to capturing gamma radiation and a neutron. Data in FIGS. 1 and 2 is obtained using a Li-containing elpasolite. FIG. 1 includes electronic pulses when the radiation detector is at 22° C., and FIG. 2 includes electronic pulses when the radiation detector is at 175° C. Referring to FIG. 1, the difference between neutron and gamma radiation can be seen at approximately 1000 ns. The pulse for gamma radiation has an intense fast decay component at the beginning of the pulse which the pulse for neutron does not have. At 22° C., the scintillator has significant CVL when it captures gamma radiation. At a temperature above 150° C., CVL is insignificant and the non-CVL mechanism becomes predominant. In FIG. 2, an analysis of the electronic pulses demonstrate that the electronic pulses begin to separate at approximately 1500 ns, and become more apparent as time is in a range of 2500 ns to 5000 ns. The pulse for neutron has a faster long-term decay than the pulse for gamma radiation. The electronic pulse can be analyzed up to 7000 ns and even higher. Thus, classification of different radiation types over a larger temperature range can be implemented.

After reading this specification, one of ordinary skill in the art will understand that the scope of the teachings are not limited only to Li-containing elpasolites or only to discriminate between neutron and gamma radiation. The concepts as described herein can be used to change PSD techniques so that different PSD techniques may be used when the scintillator, photosensor, or both are affected by the state of the radiation detector, such as temperature, pressure, shock, another environmental condition, or any combination thereof. The teachings herein are well suited to a scintillator having different predominant luminescent mechanisms at different state conditions.

The description below includes an embodiment that can be used in well logging. In another embodiment, a radiation detector can be implemented in other environment where the state of the scintillator, photosensor, or both significantly changes during operation.

Figure 3:
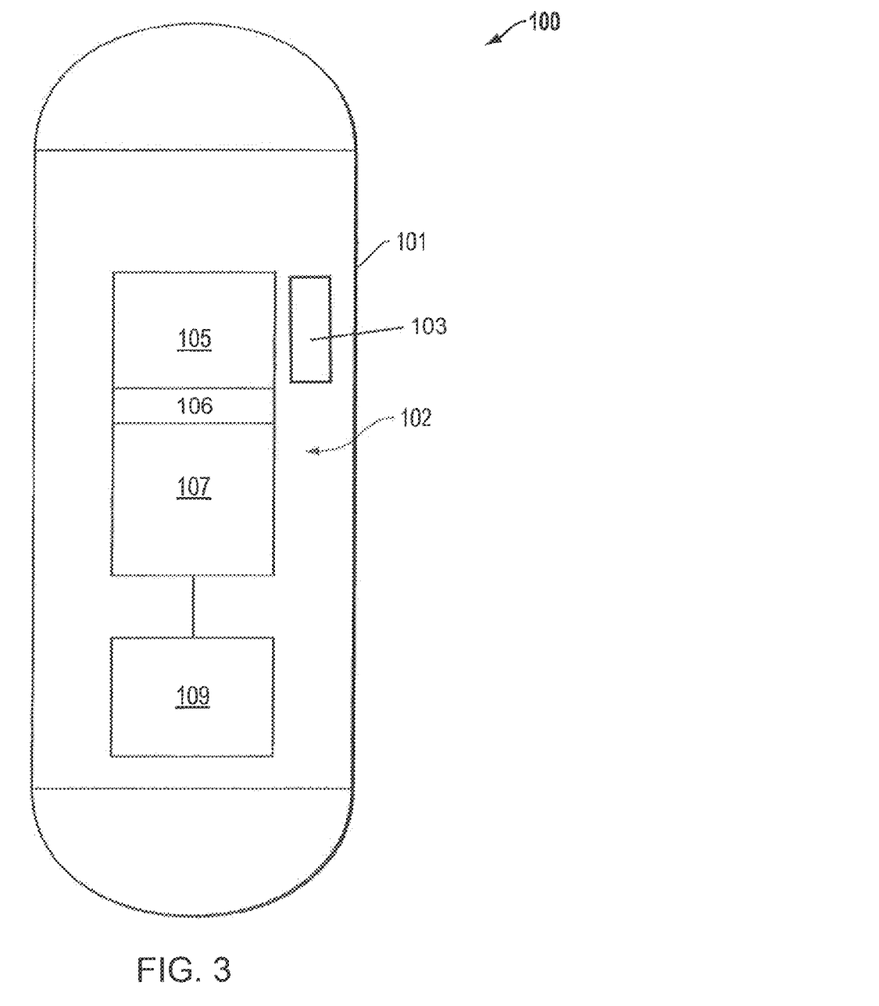
FIG. 3 includes a schematic depiction of a sonde including a radiation detector in accordance with an embodiment.

FIG. 3 includes a schematic depiction of a sonde 100 including a radiation detector 102 in accordance with an embodiment. The sonde 100 is a probe that can include a variety of devices that can be used in exploring regions and environments unsuitable for humans. One such application is exploratory drilling or well-logging applications in which holes can be drilled within the crust of the earth in order to explore and characterize rock structures below the surface. The sonde 100 may be a stand-alone tool or may be incorporated with other equipment near the distal end of a drill string, and thus, the sonde 100 can be a particular type of downhole well logging tool that can be used within a well bore. The other equipment can include a drill bit at the tip of the distal end, a turbine coupled to the drill bit, a generator or alternator coupled to the turbine, a battery or other energy storage device, a variety of sensors, such as rotational speed sensors, positional sensors, pressure sensors, and the like. The drill string includes sections of pipe that are screwed together and are manipulated at the proximal end of the drill string, which is at the surface. For example, the entire drill string can be rotated during drilling Mud pumps outside the well bore pump mud along the drill string. The mud serves multiple purposes, one of which is to cause the rotor of the downhole turbine to spin. During drilling, many different parts of the drill string can be in motion. For example, the entire drill string may be rotating while mud is being pumped along the drill string which in turn causes the turbine to operate, which in turn causes the drill bit to rotate.

As illustrated, the sonde 100 can include a housing 101 for encapsulating and enclosing the radiation detector 102, can be part of a measurement-while-drilling ("MWD") device. The housing 101 can be made of a material suitable for withstanding harsh environments including large temperature shifts from ambient conditions to temperatures in excess of 150° C., in excess of 200° C. or higher. The housing is sealed against pressures as high as 70 MPa (10,000 pounds per square inch). Additionally, the housing 101 may be capable of withstanding severe mechanical stresses and vibrations. As such, the housing 101 can be made of a metal or metal alloy material. Often, the housing 101 can be sealed to protect sensitive components inside from liquids, such as water, encountered in well-logging applications.

The radiation detector 102 can include materials and components suitable for detecting certain types of radiation in order to facilitate analyzing and characterizing rock structures surrounding the sonde 100, including properties such as the presence of hydrocarbon materials, presence of water, density of the rock, porosity of the geological formations, and the like. In a particular embodiment, the radiation detector 102 includes a scintillator 105, an optical coupling member 106, a photosensor 107, and a processor module 109. The scintillator 105 can be optically coupled to the photosensor 107, and the processor module 109 can be unidirectionally or bidirectionally coupled to the photosensor 107. The radiation detector 102 further includes a temperature sensor 103 adjacent to the scintillator 105, the photosensor 107, or both that can be used to sense the temperature and provide state information to the processor module 109.

The scintillator 105 can be a material that responds to radiation by emitting scintillating light. In accordance with an embodiment, the scintillator 105 can include a scintillator material that, for a particular radiation type, has different predominant luminescent mechanisms at different temperatures. In accordance with another embodiment, the scintillator 105 can be sensitive to different types of radiation, such as neutrons and gamma radiation. The scintillator 105 can include an alkali rare earth halide. In a particular embodiment, the scintillator 105 includes $^6$Li. In an embodiment, the $^6$Li content, as a percentage of total Li content, can be a naturally occurring amount, which is approximately 7%. Thus, the Li does not need to be enriched with $^6$Li. In another embodiment, enriched $^6$Li may be used to increase the $^6$Li content to at least 10%, at least 20%, or higher. In a particular embodiment, the scintillator includes a material having a general formula of $A_2DRE_{(1-y)}M_yX_6$ wherein:

A is at least one alkali metal element;
D is Li or a mixture of Li and Na;
RE is at least one rare earth element;
M is at least one trivalent metal element;
X is at least one halide; and
y is at least 0 and less than 1.

In the general formula, A can be Cs, Rb, K, or any combination thereof. A heavier element may help to form a more dense material that may help to capture radiation. Thus, Cs may be used for A. The scintillator 105 includes Li, so that the scintillator 105 can emit scintillating light in response to capturing neutrons. In an embodiment, Li makes up at least 50 atomic %, at least 75 atomic % or 100 atomic % of D. The trivalent metal element may be a metal element other than a rare earth element. For example, the trivalent metal element may include Al, Ga, or a trivalent transition metal element other rare earth elements. In an embodiment, none of the trivalent metal element is present, and thus, y is equal to 0. RE can be a combination of elements, such as Ce or Pr with another rare earth element. Thus, Ce-doped or Pr-doped compounds may be used.

In an embodiment, X includes Cl. In a particular embodiment, X is only Cl. In another particular embodiment, X further includes another halide different from Cl, for example, Br or F. While an F-containing compound may have CVL, the light output of the F-containing compound has a lower light output as compared to the Cl-containing compound. Regarding Br, when only Br is present for X, the compound may not have any significant CVL. Accordingly, when at least two halides are present in the compound, Cl may be at least 50 atomic % of the total halide composition.

In an embodiment, the scintillator 105 can include a Cl-containing elpasolite. Exemplary compounds include $Cs_2LiYCl_{(6-x)}Br_x$:Ce and $Cs_2LiLaCl_{(6-x)}Br_x$:Ce, where x is 0 to 3. Particular compounds include $Cs_2LiYCl_6$:Ce and $Cs_2LiLaCl_6$:Ce. After reading this specification, skilled artisans will understand that such exemplary materials are to illustration and not limit the scope of possible materials that can be used for the scintillator 105.

The optical coupling material 106 can include an optically clear material, such as a silicone rubber or a clear epoxy. The photosensor 107 can generate an electronic pulse in response to receiving scintillating light from the scintillator 105 or in response to noise. The photosensor 107 can be a photomultiplier tube ("PMT"), a semiconductor-based photomultiplier, or another suitable device that generates an electronic pulse in response to the scintillating light. The electronic pulse from the photosensor 107 can be transmitted to the processor module 109.

The processor module 109 may be able to receive state information associated with the radiation detector 102. In an embodiment, the state information can include temperature or pressure of the sonde 100 or a location adjacent to sonde 100, operational parameters, such are turbine speed, drill bit speed, rotational speed of the drill string, or other suitable information. In a particular embodiment, the processor module 109 can receive state information from the temperature sensor 103 that is adjacent to the scintillator 105 and photosensor 107.

The processor module 109 can receive an electronic pulse from the photosensor 107. The processor module 109 may include an amplifier, an analog-to-digital converter, a processor, a memory, another suitable component, or any combination thereof. In an embodiment, the amplifier can be a high fidelity amplifier in order to reduce the likelihood of losing information within an electronic pulse as generated by the photosensor 107. In another embodiment, an electronic pulse generated by the photosensor 107 may not be amplified, and thus, the pulse as generated by the photosensor 107 may be directly received by the analog-to-digital converter or the processor module 109, so that the received pulse is substantially the same as the pulse when it was originated.

The processor module 109 can also include electronic components that can process an electronic pulse from the photosensor 107. More details regarding the operation of the processor module 109 with respect to processing electronic pulses from the photosensor 107 are described in more detail later in this specification. While the processor module 109 can be contained within the sonde 101, the processor module 109 may be located outside of the well bore, such as at the surface. When the processor module 109 is within the sonde 101, the processor module 109 may be powered by a downhole generator, alternator, or local energy storage device, such as a battery.

The radiation detector 102 can be used within the well bore to allow MWD or Wireline information to be obtained. U.S. Pat. No. 8,173,954, which is incorporated in its entirety, addresses operation of a radiation detector similar to that previously described. The radiation detector 102 in accordance with concepts as described herein is configured to provide further functionality not explicitly disclosed in U.S. Pat. No. 8,173,954.

The radiation detector 102 may be used in well-logging applications and, as such, the radiation detector 102 may be exposed to harsh conditions. In a particular application, such as a well-logging application, the sonde 100 and radiation detector 102 may be subject to high temperatures that can exceed 150° C. The scintillator 105 can emit scintillating light with a predominant luminescent mechanism for a particular radiation, such as CVL for gamma radiation, at one temperature, and another predominant luminescent mechanism for the particular radiation, such as non-CVL for gamma radiation, at another temperature. Further the scintillator can be sensitive to more than one radiation type, such as gamma radiation and neutrons. The processor module 109 can be configured to select a PSD technique that is useful for discriminating between the different radiation types over a larger range of temperatures than previously possible.

Figure 4:
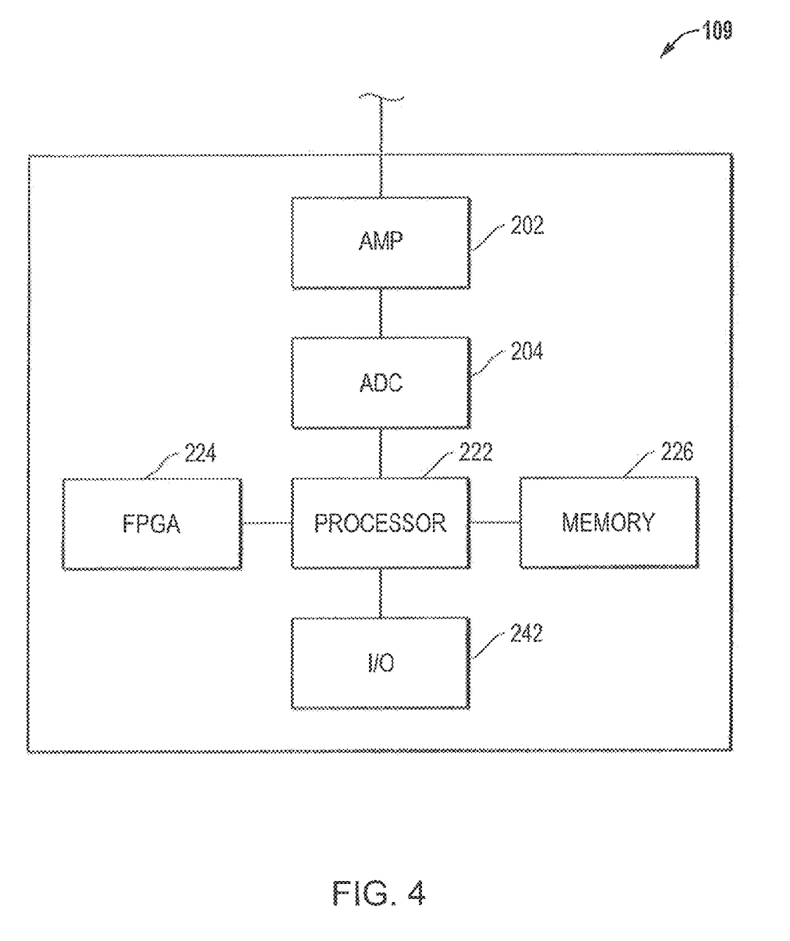
FIG. 4 includes a schematic view of a portion of a processor module in accordance with an embodiment.

FIG. 4 includes a schematic diagram of an illustrative, non-limiting embodiment of the processor module 109. As illustrated, an amplifier 202 is coupled to an analog-to-digital converter 204, which is coupled to a processor 222. In an embodiment, the amplifier 202 can be a high fidelity amplifier. The processor 222 is coupled to a programmable/re-programmable processing module ("PRPM"), such as a field programmable gate array ("FPGA") 224 or application-specific integrated circuit ("ASIC"), a memory 226, and an input/output ("I/O") module 242. The couplings may be unidirectional or bidirectional. The functions provided by the components are discussed in more detail below. In another embodiment, more, fewer, or different components can be used in the processor module 109. For example, functions provided by the FPGA 224 may be performed by the processor 222, and thus, the FPGA 224 is not required. The FPGA 224 can act on information faster than the processor 222.

During operation, an electronic pulse from the photosensor 107 can be received at the processor module 109, the electronic pulse can be amplified by the amplifier 202, and the amplified electronic pulse can be converted to a digital pulse by the analog-to-digital converter 204. The digital pulse can be received by the processor 222. The digital pulse can be processed by the processor 222, sent from the processor 222 to the FPGA 224, to the memory 226, or to the I/O module 242. Although not illustrated, the processor 222 can receive state information from a sensor or another device within the radiation detector or outside of the radiation detector. The state information may be stored in the memory 226. When the digital pulse is received by the processor 222, the processor 222 can request the latest state information from the memory 226 or from one or more sensors or other devices, if the processor 222 does not already have such state information. The digital pulse and state information can be sent from the processor 222 to the FPGA 224.

Before the FPGA 224 is used in well logging or another application, information is programmed into the FPGA 224. Such information can include different PSD techniques to be used at different temperatures. If needed or desired, PSD parameters corresponding electronic pulses may be programmed into the FGPA 224. The electronic pulses may be actual or simulated pulses that can be used for comparison. For the example, the electronic pulses can include known good pulses at different temperatures that be used for comparison or confirmation of an electronic pulse that is subsequently received when the sonde 100 is within a well bore.

Some or all of the functions described with respect to the FPGA 224 may be performed by the processor 222, and therefore, the FPGA 224 is not required in all embodiments. Further, the FPGA 224, the memory 226, the I/O module 242, or any combination thereof may be within the same integrated circuit, such as the processor 222. In another embodiment, the processor module 109 does not need to be housed within the radiation detector 102. The processor module 109 may be outside the well bore. Still further, at least one component of the processor module 109, as illustrated in FIG. 4, may be within the radiation detector 102, and at least one other component may be outside the radiation detector 102, such as outside the well bore. In well-logging applications, information from the devices close to the distal end of the drill string, such as the radiation detector 102, may take approximately 0.5 to approximately 5 minutes to reach the surface. The processor module 109 within the radiation detector 102 can allow operations to proceed quickly without having data transmission delays.

Figure 5:
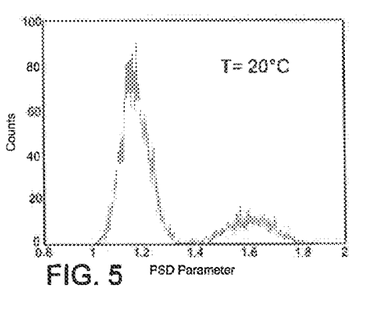
FIGS. 5 to 9 include plots of counts as a function of a PSD parameter using a particular pulse shape discrimination technique.
Figure 8:
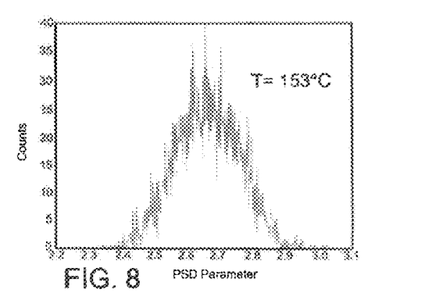
Figure 9:
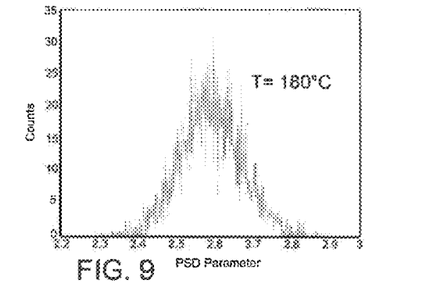
Figure 10:
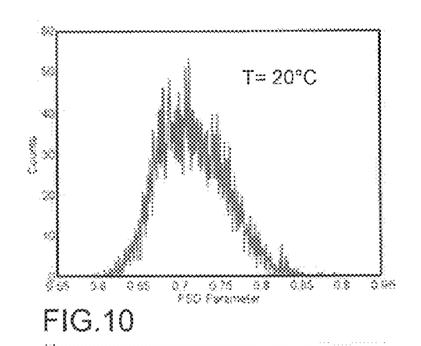
FIGS. 10 to 14 include plots of counts as a function of a PSD parameter using another pulse shape discrimination technique.

Regarding PSD techniques and temperatures, FIGS. 5 to 14 include plots of PSD parameters corresponding to electronic pulses from a photosensor in response to scintillating light received from a scintillator at different temperatures. In an embodiment, the data in FIGS. 5 to 14 are obtained using the scintillator 105, and photosensor 107, and in another embodiment, a different scintillator having substantially identical composition as the scintillator 105, and a different photosensor having the same model and manufacturer as the photosensor 107 may be used. FIGS. 5 and 10 correspond to data when the scintillator is at 20° C., FIGS. 6 and 11 correspond to data when the scintillator is at 50° C., FIGS. 7 and 12 correspond to data when the scintillator is at 100° C., FIGS. 8 and 13 correspond to data when the scintillator is at 153° C., and FIGS. 9 and 14 correspond to data when the scintillator is at 180° C.

FIGS. 5 to 9 are obtained using a PSD technique that is well suited to discriminate between neutrons and CVL for gamma radiation, and FIGS. 10 to 14 are obtained using a different PSD technique that is well suited to discriminate between neutrons and gamma radiation without CVL. For the CVL-based PSD technique, peaks corresponding to neutrons are closer to the y-axis, and peaks corresponding to gamma radiation are farther from the y-axis. Gamma radiation is relatively faster than neutron when scintillating light for gamma radiation is generated by CVL. For the non-CVL-based PSD technique, peaks corresponding to gamma radiation are closer to the y-axis, and peaks corresponding to neutrons are farther from the y-axis. Neutrons are relatively faster than gamma radiation when scintillating light for gamma radiation is generated by non-CVL.

Figure 6:
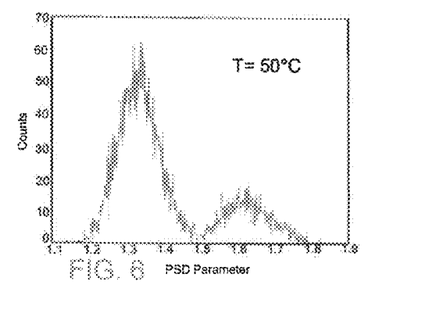
Figure 7:
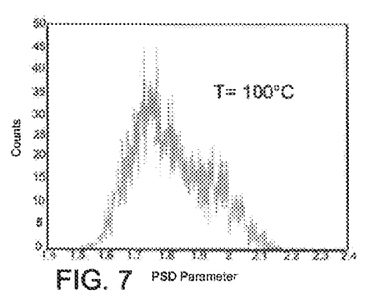
Figure 11:
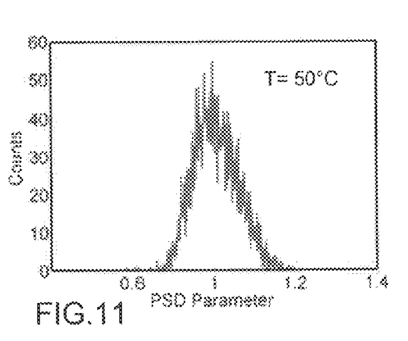
Figure 12:
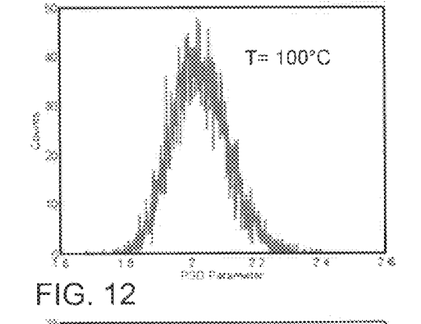
Figure 13:
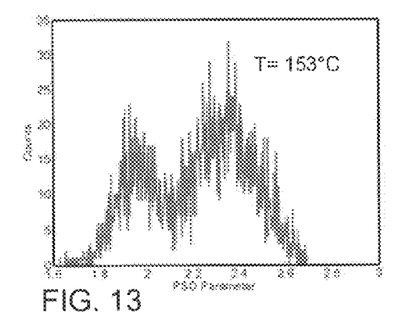
Figure 14:
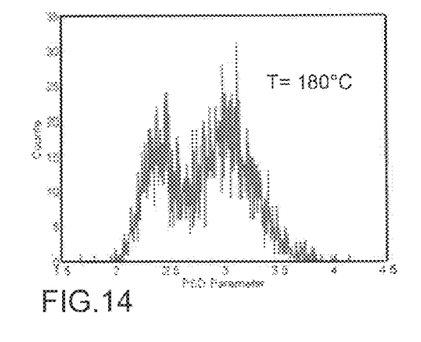

In FIGS. 5 to 7, peaks corresponding to gamma radiation and neutrons can be discerned. In FIGS. 8 and 9, the different peaks corresponding to gamma radiation and neutrons cannot be readily discerned. Thus, the PSD technique that is tailored for CVL may be more difficult as the temperature goes from 100° C. to 150° C. In FIGS. 10 to 12, the different peaks correspond to gamma radiation and neutrons cannot be readily discerned. In FIGS. 13 and 14, the peaks corresponding to gamma radiation and neutrons can be discerned. Thus, the PSD technique that is tailored for non-CVL may be better suited as the temperature goes from 100° C. to 150° C. and higher.

At a temperature between 100° C. and 150° C., the FPGA 224 can be programmed with a switchover temperature, which is a temperature at which the FPGA 224 switches between the different PSD techniques. In embodiment, the switchover temperature may be in a range of 115° C. to 130° C., and in a particular embodiment, the switchover temperature may be in a range of 122° C. to 126° C.

Figure 15:
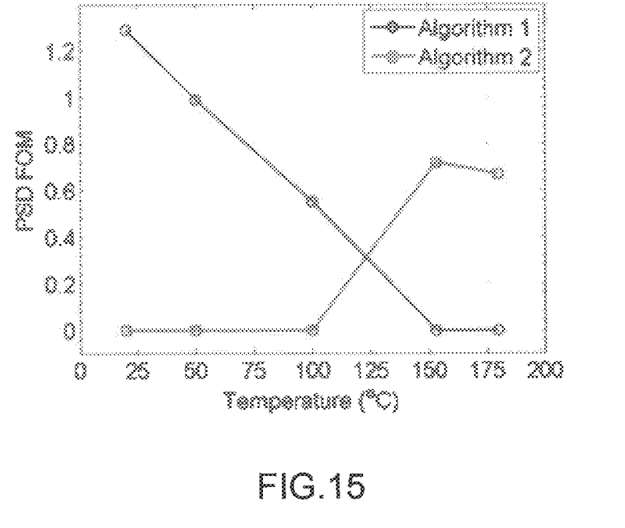
FIG. 15 includes plots PSD figure of merit as a function of temperature.

A non-limiting technique for determining the switchover temperature may be performed by a figure-of-merit ("FOM) analysis. FOM is an absolute value of a unitless measurement that is a difference in the centroids between the gamma radiation and neutron peaks divided by the sum of the FWHMs for the gamma radiation and neutron peaks. Plots can be generated for radiation captured at a variety of temperatures for each of the PSD techniques, such as illustrated in FIGS. 5 to 14. FIG. 15 includes plots of FOM for the PSD techniques as a function of temperature. For the PSD technique corresponding to CVL, FOM decreases with increasing temperature, and for the PSD technique corresponding to non-CVL, FOM increases from 20° C. to 153° C. The switchover temperature can be the temperature at which FOM for the non-CVL-based PSD technique is greater than FOM for the CVL-based PSD technique. Using the data in FIG. 15, the switchover temperature can be 124° C.

An exemplary method of using the apparatus is described in more detail below. The method is to illustrate a particular method of use. After reading this specification, skilled artisans will understand that many other applications exist and that the teachings can be used as described or with some changes.

Figure 16:
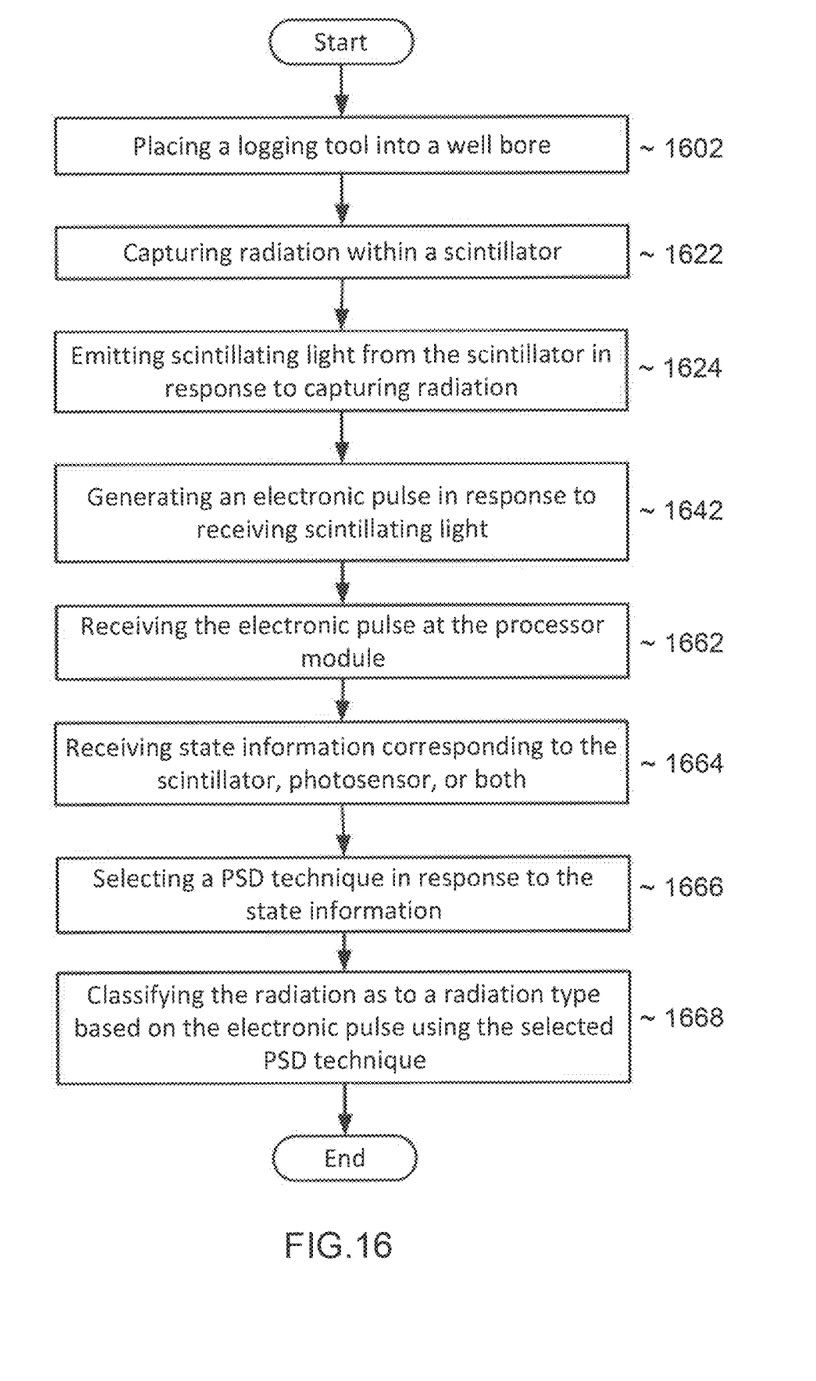
FIG. 16 includes a flow chart illustrating a method of using a radiation detector in accordance with an embodiment.

The method can include placing a logging tool into a well bore, at block 1602 in FIG. 16. The logging tool can include the sonde 100 as previously described. The method can further include capturing radiation within the scintillator, at block 1622, and emitting scintillating light from the scintillator 105 in response to capturing the radiation, at block 1624. In a particular embodiment, the radiation can be gamma radiation, a neutron, or a combination of thereof. The method can include generating an electronic pulse at the photosensor 107 in response to receiving the scintillating light, at block 1642.

The method can include receiving the electronic pulse at the processor module 109, at block 1662, and receiving from state information corresponding to the scintillator 105, the photosensor 107, or both, at block 1664. The state information should be at or close to the same time as the radiation is captured by the scintillator 105. In a particular embodiment, a current sensor can be used to monitor electron generation within the photosensor 107 or current flowing from the photosensor 107. When the current sensor detects current above a threshold, the module 109 can receive state information from the temperature sensor 103.

The method can further include selecting a PSD technique in response to the state information, at block 1666. In an embodiment, the state information may be used by the FPGA 224 to select the PSD technique. Referring the FIGS. 5 to 14, the FPGA 224 can select the CVL-based PSD technique when the state information corresponds to the scintillator 105 being at a temperature 124° C. or select the non-CVL-based PSD technique when the temperature is greater than 124° C.

The method can still further include classifying the radiation as to a radiation type based on the electronic pulse using the selected PSD technique, at block 1668. The electronic pulse can be analyzed by the FPGA 224 in the processor module 109. The classification can be performed by comparing the PSD parameter to a predetermined threshold value. When the CVL-based PSD technique is used (for example, at a temperature no higher than 124° C.), a peak that is relatively fast corresponds to gamma radiation, and a peak that is relatively slow corresponds to a neutron. When the non-CVL-based PSD technique is used (for example, at a temperature higher than 124° C.), a peak that is relatively fast corresponds to a neutron, and a peak that is relatively slow corresponds to gamma radiation. Thus, the radiation can be classified using a PSD technique that is better suited to the state information of the radiation detector 102, such as the temperature of the scintillator 105, the photosensor 107, or both.

Other actions may be performed if needed or desired. In an embodiment, a counter may be used to track radiation counts. After classification, a neutron counter or a gamma radiation counter can be incremented.

Embodiments as described herein can allow for the proper classification of radiation as to radiation type over a significantly larger temperature range. With respect to an elpasolite, the radiation detector and method of using can allow for the proper classification of radiation at a temperature over 150° C. Thus, confidence levels in radiation classification are significantly improved, particularly at higher temperatures. Additionally, the concepts as described herein are extendible to many different compositions of scintillators and to environmental conditions in which signals as received by the processing module 109 change in response to such environmental conditions. Thus, the concepts as described herein can be extended to many other applications in which classifying radiation as to its correspond radiation type is needed or desired.

Many different aspects and embodiments are possible. Some of those aspects and embodiments are described herein. After reading this specification, skilled artisans will appreciate that those aspects and embodiments are only illustrative and do not limit the scope of the present invention. Additionally, those skilled in the art will understand that some embodiments that include analog circuits can be similarly implemented using digital circuits, and vice versa. Embodiments may be in accordance with any one or more of the items as listed below.

Item 1. A radiation detector can include a scintillator capable of emitting scintillating light in response to capturing radiation; a photosensor optically coupled to the scintillator; and a processor module coupled to the photosensor, wherein the processor module is configured to use a first pulse shape discrimination technique at a first state, and use a second pulse shape discrimination technique at a second state.

Item 2. The radiation detector of Item 1, wherein the scintillator and the photosensor are parts of a downhole well logging tool.

Item 3. The radiation detector of Item 2, wherein the downhole well logging tool further includes the processor module.

Item 4. The radiation detector of Item 2, wherein the processor module is spaced apart from the downhole logging tool.

Item 5. The radiation detector of Item 4, wherein the processor module is outside of a well bore.

Item 6. A processor module can be configured to:
use a first pulse shape discrimination technique at a first state; and
use a second pulse shape discrimination technique at a second state.

Item 7. The processor module of Item 6, wherein the processor module is coupled to a photosensor that is optically coupled to the scintillator that is capable of emitting scintillating light in response to capturing radiation.

Item 8. The radiation detector or the processor module of any one of Items 1 to 5 and 7, wherein the processor module is further configured to receive state information corresponding to a temperature of the scintillator, the photosensor, or both.

Item 9. The radiation detector or the processor module of Item 8, wherein the processor module is further configured to select between the first pulse shape discrimination technique and the second pulse shape discrimination technique in response to the temperature of the scintillator, the photosensor, or both.

Item 10. The radiation detector or the processor module of any one of Items 1 to 5 and 7 to 9, wherein the processor module is further configured to receive an electronic pulse from the photosensor.

Item 11. The radiation detector or the processor module of Item 10, wherein the processor module is further configured to classify the radiation as to a radiation type based on the electronic pulse as analysed using the selected pulse shape discrimination.

Item 12. The radiation detector or the processor module of Item 10 or 11, wherein the processor module is configured to:
classify the radiation as gamma radiation when a peak of the electronic pulse is relatively fast, and as a neutron when a peak of the electronic pulse is relatively slow when the state information corresponds to the scintillator being at a first temperature; and
classify the radiation as a neutron when a peak of the electronic pulse is relatively fast, and as gamma radiation when a peak of the electronic pulse is relatively slow when the state information corresponds to the scintillator being at a second temperature.

Item 13. The radiation detector or the processor module of any one of Items 10 to 12, wherein the photosensor is configured to generate the electronic pulse in response to the photosensor receiving scintillating light from the scintillator.

Item 14. The radiation detector or the processor module of any one of Items 10 to 13, further including comparing a PSD parameter of the electronic pulse to a predetermined threshold.

Item 15. A method of detecting radiation can include emitting scintillating light from a scintillator in response to capturing radiation; generating an electronic pulse at a photosensor that is optically coupled to the scintillator; receiving state information corresponding to the scintillator, photosensor, or both; and selecting between a first pulse shape discrimination technique and a second pulse shape discrimination technique in response to the state information.

Item 16. The method of Item 15, further including classifying the radiation as to a radiation type based on the electronic pulse as analysed using the selected pulse shape discrimination.

Item 17. The method of Item 15 or 16, wherein receiving state information includes receiving temperature information corresponding to the scintillator, photosensor, or both.

Item 18. The method of Item 15, 16, or 17 further including capturing radiation at the scintillator.

Item 19. A method of well logging can include:
placing a logging tool into a well bore, wherein the logging tool includes a scintillator, a photosensor, and a temperature sensor adjacent to the scintillator, the photosensor, or both;
capturing radiation within the scintillator;
emitting scintillating light from the scintillator in response to capturing the radiation;
generating an electronic pulse at the photosensor in response to receiving the scintillating light from the scintillator;
receiving temperature information corresponding to the scintillator, photosensor, or both;
selecting between a first pulse shape discrimination technique and a second pulse shape discrimination technique in response to temperature information from the temperature sensor to determine a selected pulse shape discrimination technique; and
classifying the radiation as to a radiation type based on electronic pulse as analysed using the selected pulse shape discrimination.

Item 20. The method of any one of Items 15 to 19, further including comparing a PSD parameter of the electronic pulse to a predetermined threshold.

Item 21. The radiation detector, the processor module, or the method of any of the preceding Items, wherein a predominant luminescent mechanism of the scintillator for a particular radiation type is different at different temperatures.

Item 22. The radiation detector, the processor module, or the method of Item 21, wherein the predominant luminescent mechanism for gamma radiation is core valance luminescence at a first temperature, and the predominant luminescent mechanism for gamma radiation is non-core valance luminescence at a second temperature.

Item 23. The radiation detector, the processor module, or the method of any one of Items 1 to 5 and 7 to 22, wherein the scintillator includes an alkali rare earth halide.

Item 24. The radiation detector, the processor module, or the method of any one of Items 1 to 5 and 7 to 23, wherein the scintillator includes $^6$Li.

Item 25. The radiation detector, the processor module, or the method of any one of Items 1 to 5 and 7 to 24, wherein the scintillator includes a material having a general formula of $A_2DRE_{(1-y)}M_yX_6$ wherein:
A is at least one alkali metal element;
D is Li or a mixture of Li and Na;
RE is at least one rare earth element;
M is at least one trivalent metal element;
X is at least one halide; and
y is at least 0 and less than 1.

Item 26. The radiation detector, the processor module, or the method of Item 25, wherein X includes Cl.

Item 27. The radiation detector, the processor module, or the method of Item 26, wherein X is only Cl.

Item 28. The radiation detector, the processor module, or the method of Item 26, X further includes another halide different from Cl.

Item 29. The radiation detector, the processor module, or the method of Item 25, 26, or 28, wherein X includes F.

Item 30. The radiation detector, the processor module, or the method of any one of Items 25, 26, or 28, wherein X includes Br.

Item 31. The radiation detector, the processor module, or the method of any one of Items 25 to 30, wherein Li is enriched with $^6$Li.

Item 32. The radiation detector, the processor module, or the method of any one of Items 25 to 30, wherein Li is naturally occurring Li.

Item 33. The radiation detector, the processor module, or the method of any one of Items 25 to 32, wherein A is Cs, Rb, or K.

Item 34. The radiation detector, the processor module, or the method of any one of Items 25 to 33, wherein RE includes Y, La, Ce, Pr, or any combination thereof.

Item 35. The radiation detector, the processor module, or the method of any one of Items 25 to 34, wherein b is 0.

Item 36. The radiation detector, the processor module, or the method of any one of Items 1 to 5 and 7 to 35, wherein the processor module is configured to switch between the first and the second pulse shape discrimination techniques when the state information corresponds to the scintillator, photosensor, or both being at a temperature in a range of 100° C. to 150° C.

Item 37. The radiation detector, the processor module, or the method of any one of the preceding Items, wherein a switchover temperature between the first and second pulse shape discrimination techniques is performed using a figure-of-merit analysis.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A radiation detector comprising:
    a scintillator capable of emitting scintillating light in response to capturing radiation;
    a photosensor optically coupled to the scintillator; and
    a processor module coupled to the photosensor, wherein the processor module is configured to:
        receive state information corresponding to a temperature of the scintillator, the photosensor, or both;
        select between the first pulse shape discrimination technique and the second pulse shape discrimination technique in response to the temperature of the scintillator, the photosensor, or both; and
        use a first pulse shape discrimination technique at a first state, and use a second pulse shape discrimination technique at a second state.
2. The radiation detector of claim 1, wherein the scintillator and the photosensor are parts of a downhole well logging tool.
3. The radiation detector of claim 1, wherein the processor module is further configured to receive an electronic pulse from the photosensor.
4. The radiation detector of claim 3, wherein the processor module is further configured to classify the radiation as to a radiation type based on the electronic pulse as analysed using the selected pulse shape discrimination.
5. The radiation detector of claim 3, wherein the processor module is configured to:
    classify the radiation as gamma radiation when a peak of the electronic pulse is relatively fast, and as a neutron when a peak of the electronic pulse is relatively slow when the state information corresponds to the scintillator being at a first temperature; and
    classify the radiation as a neutron when a peak of the electronic pulse is relatively fast, and as gamma radiation when a peak of the electronic pulse is relatively slow when the state information corresponds to the scintillator being at a second temperature.
6. The radiation detector of claim 3, further comprising comparing a PSD parameter of the electronic pulse to a predetermined threshold.
7. The radiation detector of claim 1, wherein a predominant luminescent mechanism of the scintillator for a particular radiation type is different at different temperatures.
8. The radiation detector of claim 7, wherein the predominant luminescent mechanism for gamma radiation is core valance luminescence at a first temperature, and the predominant luminescent mechanism for gamma radiation is non-core valance luminescence at a second temperature.
9. The radiation detector of claim 1, wherein the scintillator includes an alkali rare earth halide.
10. The radiation detector of claim 1, wherein the scintillator includes a material having a general formula of $A_2DRE_{(1-y)}M_yX_6$, wherein:
    A is at least one alkali metal element;
    D is Li or a mixture of Li and Na;
    RE is at least one rare earth element;
    M is at least one trivalent metal element;
    X is at least one halide; and
    y is at least 0 and less than 1.
11. The radiation detector of claim 1, wherein the processor module is configured to switch between the first and the second pulse shape discrimination techniques when the state information corresponds to the scintillator, photosensor, or both being at a temperature in a range of 100° C. to 150° C.
12. The radiation detector of claim 1, wherein a switchover temperature between the first and second pulse shape discrimination techniques is performed using a figure-of-merit analysis.
13. A processor module configured to:
    switch between first and the second pulse shape discrimination techniques when state information corresponds to the scintillator, photosensor, or both being at a temperature in a range of 100° C. to 150° C.;
    use the first pulse shape discrimination technique when the temperature is at a first state; and
    use the second pulse shape discrimination technique when the temperature is at a second state.
14. A method of detecting radiation comprising:
    emitting scintillating light from a scintillator in response to capturing radiation;
    generating an electronic pulse at a photosensor that is optically coupled to the scintillator;
    receiving an electronic pulse from the photosensor;
    receiving state information corresponding to the scintillator, photosensor, or both;
    classifying the radiation as gamma radiation when a peak of the electronic pulse is relatively fast, and as a neutron when a peak of the electronic pulse is relatively slow when the state information corresponds to the scintillator being at a first temperature; and
    classifying the radiation as a neutron when a peak of the electronic pulse is relatively fast, and as gamma radiation when a peak of the electronic pulse is relatively slow when the state information corresponds to the scintillator being at a second temperature.

15. The method of claim 14, wherein a first pulse shape discrimination technique is used when the scintillator is at the first temperature, and a second pulse shape discrimination is used at the scintillator is at the second temperature.

16. The method of claim 15, further comprising switching between the first and the second pulse shape discrimination techniques when the scintillator, photosensor, or both is at a temperature in a range of 100° C. to 150° C.

17. The method of claim 14, further comprising comparing a PSD parameter of the electronic pulse to a predetermined threshold.

18. The method of claim 14, wherein:
the method further comprises:
   placing a logging tool into a well bore, wherein the logging tool comprises the scintillator, the photosensor, and a temperature sensor adjacent to the scintillator, the photosensor, or both; and
   capturing radiation within the scintillator; and
generating the electronic pulse is performed in response to receiving the scintillating light from the scintillator.

* * * * *